Feb. 27, 1923.
F. R. LEONARD
HOE
1,446,802
Filed May 27, 1921
2 sheets-sheet 2
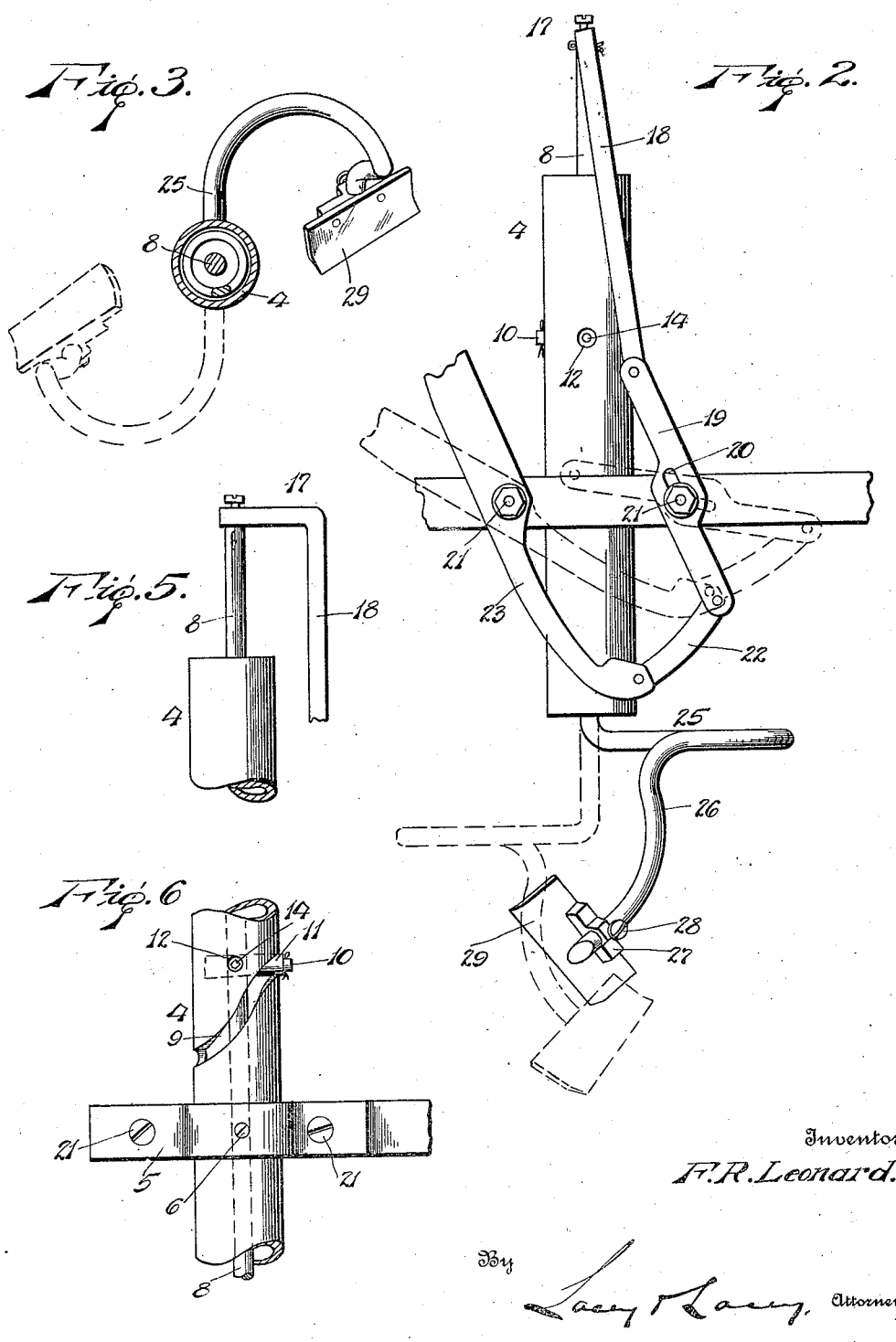
Inventor
F. R. Leonard.
By Lacey & Lacey, Attorney.

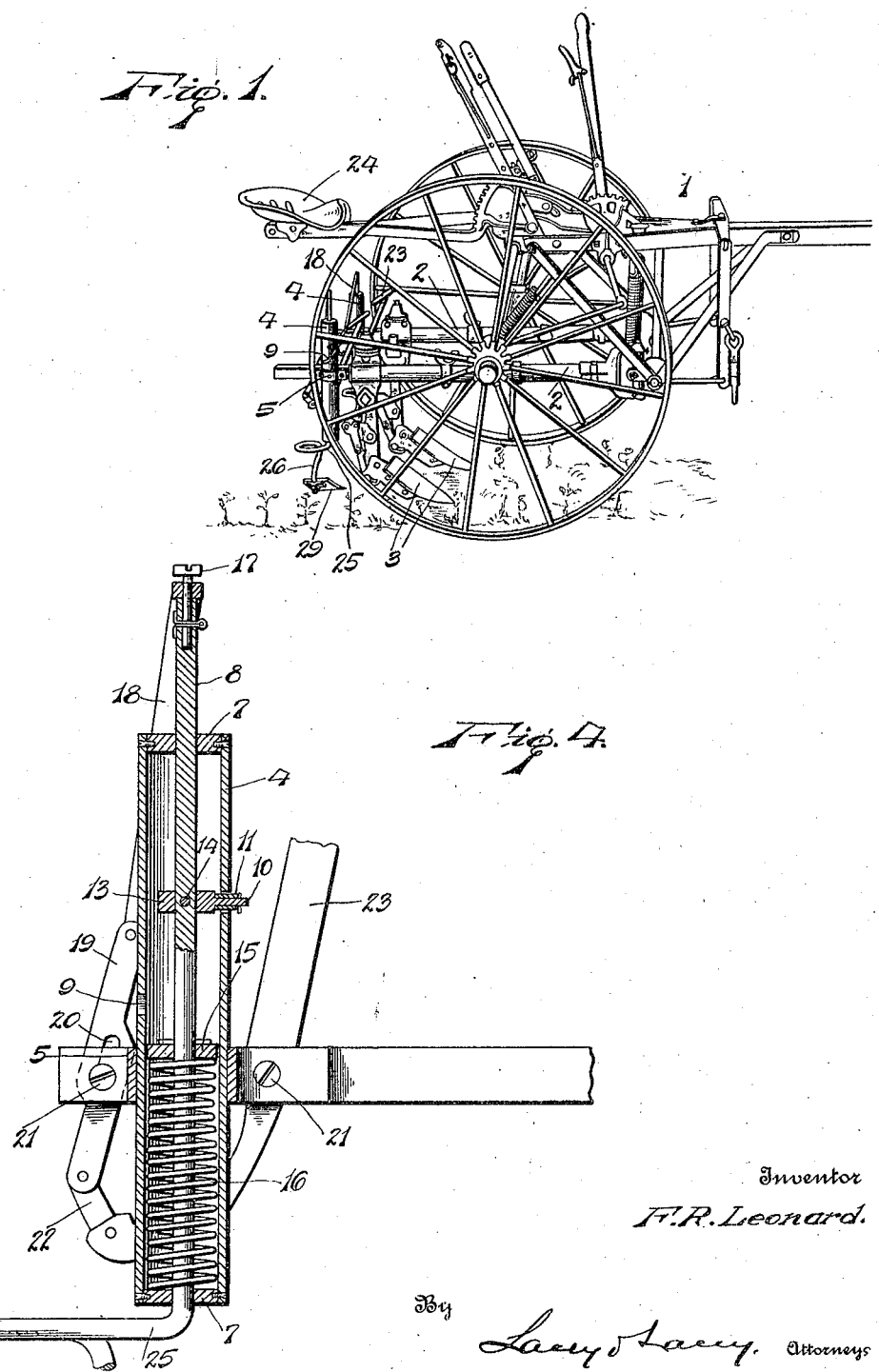

Patented Feb. 27, 1923.

1,446,802

UNITED STATES PATENT OFFICE.

FAYETTE R. LEONARD, OF HOQUIAM, WASHINGTON.

HOE.

Application filed May 27, 1921. Serial No. 472,950.

*To all whom it may concern:*

Be it known that I, FAYETTE R. LEONARD, citizen of the United States, residing at Hoquiam, in the county of Grays Harbor and State of Washington, have invented certain new and useful Improvements in Hoes, of which the following is a specification.

This invention relates to wheeled hoes and is intended particularly for use in cutting out weeds from rows of growing cotton plants but is adapted for similar use in connection with other crops.

The invention seeks particularly to provide a blade which will be given a rotary as well as a reciprocatory motion so that it will be projected quickly across the row of plants to cut out the undesired growth and as quickly withdrawn so that it will not ride against and over the plants which are to be retained as the implement is drawn along the row.

The invention seeks further to provide an improved operating mechanism whereby the desired results may be obtained easily and without imposing fatigue upon the operator.

Other incidental objects will appear in the course of the following description and the invention resides in certain novel features which will be particularly pointed out in the claims following the description.

In the drawings:

Figure 1 is a perspective view of a cultivator having my improved chopper applied thereto, Figure 2 is an enlarged side elevation of the chopper, Figure 3 is a horizontal section of the same, Figure 4 is a vertical section thereof, Figure 5 is a detail view of the upper end of the shank of the hoe and the pitman or connecting rod attached thereto, and Figure 6 is a detail side elevation of a portion of the cylinder or casing.

The cultivator 1 may be of any well known or preferred type and as illustrated is provided with cultivator beams 2 mounted upon which are cultivator shovels 3 which are adapted to throw loose earth up around the growing plants or to scrape surplus soil therefrom, as may be desired, and as will follow from the position of the cultivator relative to the plants. Near the rear end of each cultivator beam I secure thereon the vertically disposed cylinder or casing 4 which is secured to the beam by a strap or boxing 5 applied to the beam and a set screw 6 inserted through the wall of the boxing or strap so as to secure the casing or cylinder in any desired position. The ends of the cylinder are closed by plugs or caps 7 which are provided centrally with openings through which the shank 8 of the hoe passes. The cylinder is further provided in its upper portion with an inclined slot 9 in which plays a pin 10 carried by the shank and preferably having a roller 11 mounted thereon so as to reduce frictional wear. Openings 12 are formed through the wall of the cylinder to facilitate the assembling of the pin 10 with the shank 8, the pin being provided with a perforated inner body 13 through which a fastening pin 14 is inserted, as clearly shown in Figure 4. An abutment disk 15 is also fitted upon the shank 8 below the pin 10 and a spring 16 is coiled around the shank between the bottom of the cylinder and said abutment, as clearly shown in Figure 4, the spring being normally expanded and consequently yieldably holding the shank and the hoe in raised position. In the upper end of the shank 8 a swivel pin or bolt 17 is fitted and upon said pin, between the end of the shank and the head of the pin, is loosely engaged the upper end of a pitman 18, the said pitman being offset at its upper end as shown clearly in Figure 5, so as to fit around the swivel 17 and depend therefrom parallel with the cylinder 4 and out of contact therewith. The lower end of the pitman 18 is pivoted to the upper or rear end of a shifting lever 19 which is provided intermediate its ends with a longitudinal slot 20 engaging around one of the bolts 21 which secure the boxing or strap 5 to the beam 2 while the lower or forward end of the said lever 19 is pivoted to one end of a short link 22 depending therefrom and pivoted to the end of a foot lever 23. The foot lever is pivotally mounted upon the beam 2 upon the securing bolt 21 which aids in fastening the strap or boxing 5 in place, the free end of the said lever extending upwardly to a point where it may be conveniently reached by the operator from the seat 24 of the cultivator.

The lower portion of the shank 8, below the cylinder or casing 4, is bent laterally as shown at 25 and is doubled upon itself so as to describe a substantially semicircular arc as shown most clearly in Figure 3, and from the end of the said arc the shank is carried downwardly in a slight curve as shown at 26 so that its extremity, when at rest, will be directed toward the rear of the cultivator. About the extremity of the depending portion 26 of the shank is fitted a boxing or clamp 27 which is adjustably secured to the shank by a set screw 28 and upon which is rigidly secured the blade 29. By shifting the clamp 27 longitudinally upon as well as circularly about the portion 26 of the shank the angle or set of the blade may be readily varied so that it will cut into the plants in any desired manner.

The construction and arrangement of the several parts of the device being thus made known, it is thought the operation of the same will be readily understood. The cultivator is driven along the row of plants in the usual manner and the shovels or cultivator blades 3 will operate constantly to loosen and turn over the surface soil, the chopper blades 29 being held normally above and out of contact with the plants. When the driver observes a growth of weeds which should be removed, he presses sharply upon the foot lever 23 and thereby swings the same about its pivot so that the lower end thereof is swung upwardly, as indicated by the dotted lines in Figure 2. This swinging movement of the foot lever will be transmitted through the link 22 to the shifting lever 19 and through the same to the pitman 18 which will thereupon be drawn downwardly so as to depress the shank 8 and the blade carried thereby. As the hoe is thus depressed the crank pin 10 carried by the shank will ride against the lower wall of the slot 9 and will be thereby forced to turn in the cylinder so that the shank and the hoe will be rotated as they descend, this motion being clearly indicated in Figure 3. The blade will, therefore, be caused to swing forwardly and across the row of plants in harmony with the forward travel of the cultivator and will strike the plants and any soil which may be heaped about the same at the proper angle to cut readily through same without strain upon any of the supporting parts. At the end of the stroke, the operator releases the pressure upon the foot lever and the spring 16 at once expands so that the hoe will be instantly raised and, as it ascends, the crank pin 10 will ride against the upper wall of the slot 9 and be thereby caused to rotate in a reverse direction and return the blade to its initial position. The blade will thus withdraw from the plants backwardly with respect to the direction of travel of the cultivator and will consequently not ride against and beat down the plants which are to be left standing.

It will be readily noted that my device is very easily operated, is direct acting, and will respond quickly to the actuating force. The pin and slot mounting of the shifting lever 19 permits the said lever to slide forwardly as it turns about its pivotal support and this compound movement of said lever applies a very strong leverage to the blade at the instant of its contact with the plants and the operator is thus relieved of the necessity of applying additional and undue force to the foot lever as it nears the end of its stroke. The swivel connection of the pitman to the upper end of the shank relieves the shank of all twisting strain so that any tendency of the parts to bind is eliminated and the cylinder or casing 4 may be set at any desired angle to the beam so as to give a wide range of adjustment to the blade without necessitating any shifting of the levers and their connections out of parallelism with the beam.

Having thus described the invention, what is claimed as new is:

1. An apparatus for the purpose set forth comprising a blade, yieldable means for normally supporting the blade above the ground, means for reciprocating the blade, and means whereby reciprocation of the blade will effect a swinging movement of the same about the yieldable supporting means.

2. In a device for the purpose set forth, the combination of a vertically disposed shank having its lower portion projecting laterally and eccentrically and having its extremity slightly curved in a vertical plane, a blade adjustable along and around said extremity, and means for actuating the shank whereby to swing the blade forwardly and downwardly.

3. In a device for the purpose set forth, the combination of a vertically disposed casing, a shank slidably and rotatably fitted through said casing, a crank pin carried by said shank intermediate the ends of the casing, a cam on the casing engaged by said crank pin, a hoe carried by the lower end of the shank, yieldable means acting upon the shank to hold it normally raised, and means acting on the shank in opposition to said yieldable means.

4. In a device for the purpose set forth, the combination of a vertically disposed casing having a cam in its upper portion, a shank extending through said casing, a crank pin carried by said shank and engaging said cam, a hoe carried by the lower end of the shank, a spring disposed within the casing and acting on the shank to hold it normally raised, and means acting on the upper end of the shank to depress the same.

5. In a device for the purpose set forth, the combination of a supporting frame, a shank disposed vertically upon the frame, a crank pin carried by said shaft, a cam engaged by said pin, means for yieldably holding the shank in raised position, a pitman having its upper end swiveled to the upper end of the shank, a floating lever mounted upon the frame and pivotally attached to said pitman, and means for actuating said lever.

6. In a device for the purpose set forth, the combination of a supporting frame, a shank disposed vertically upon the frame, a hoe carried by said shank, means for yieldably holding the shank in raised position, a pitman swiveled to the upper end of the shank, a floating lever pivoted to said pitman, a foot lever pivoted upon the frame in rear of the floating lever, a link connecting the forward ends of the foot lever and the floating lever whereby oscillation of the foot lever will reciprocate the shank, and means for rotating the shank as it is reciprocated.

In testimony whereof I affix my signature.

FAYETTE R. LEONARD. [L. S.]